July 31, 1956 C. MYERS 2,757,274

LIGHTING CONTROL SYSTEM

Filed March 10, 1954 2 Sheets-Sheet 1

INVENTOR.
Carmel Myers
BY Darby & Darby,
HER ATTORNEYS.

INVENTOR.
Carmel Myers
BY Darby & Darby
HER ATTORNEYS

United States Patent Office 2,757,274

Patented July 31, 1956

2,757,274

LIGHTING CONTROL SYSTEM

Carmel Myers, New York, N. Y.

Application March 10, 1954, Serial No. 415,319

1 Claim. (Cl. 240—1.3)

Figure 1:
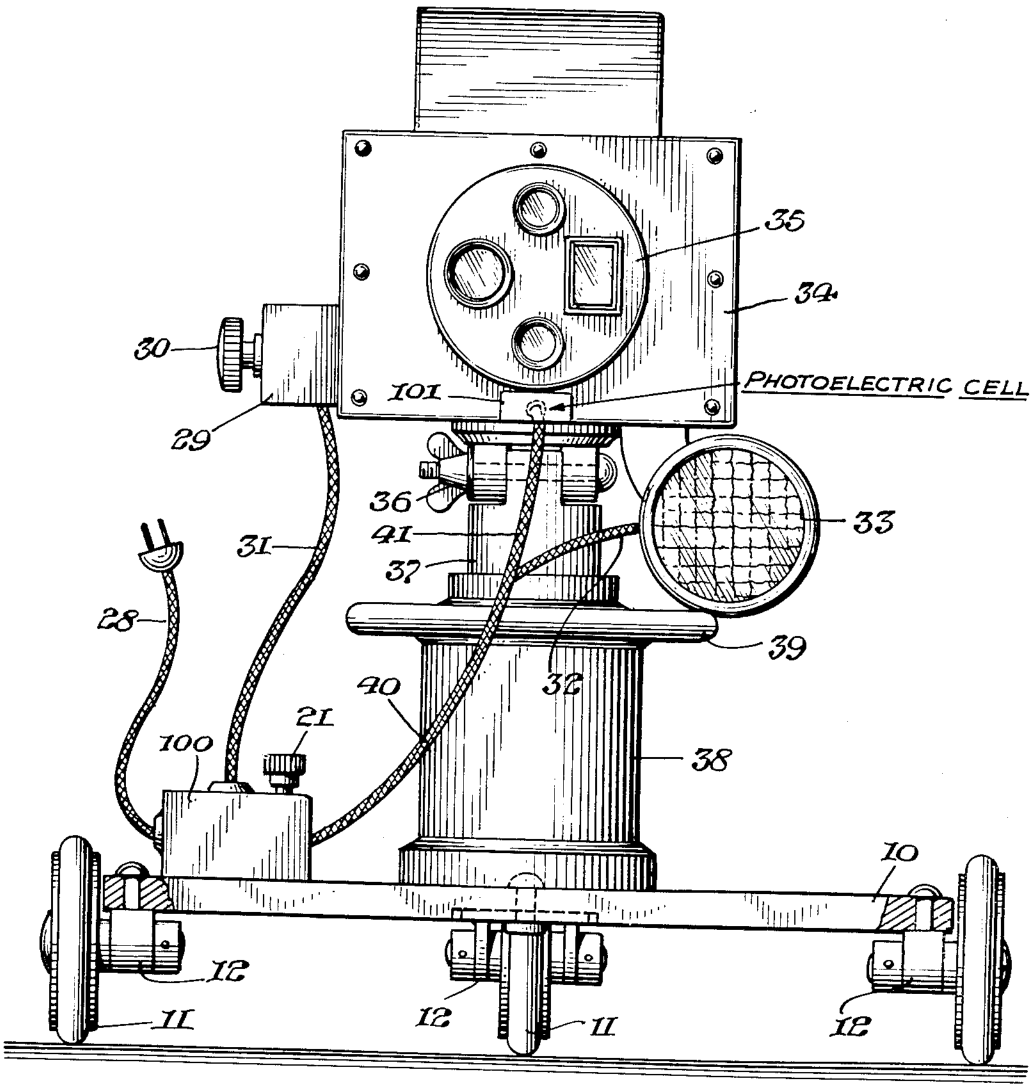

This invention comprises a self-adjusting television or motion picture lighting system involving in combination a mobile television or motion picture camera and a lighting array for a scene to be televised or photographed in which all of the lights may be fixed with respect to the scene or in which some of the lights are fixed with respect to the scene and others are movable with respect thereto with the pick-up camera.

A broad object of this invention is to provide means for automatically decreasing or increasing the intensity of illumination of a scene being televised by reason of relative movement between a television or motion picture camera and the actors or movable objects constituting the action of the scene being televised.

A more specific object of the invention is to provide a light sensitive illumination controlling system for television pick-up, wherein relative movement of the camera and elements of the action of the scene will automatically change the intensity of illumination of the scene to maintain substantially constant intensity of illumination thereof for all normal relatively varied positions of the pick-up camera and the elements of the action.

Other and more detailed objects of the invention will be apparent from the following description of the embodiment thereof illustrated in the attached drawings.

This application is a continuation-in-part of my co-pending application Serial No. 251,485, filed October 16, 1951 for Television Lighting Apparatus, now Patent No. 2,676,243.

Figure 2:
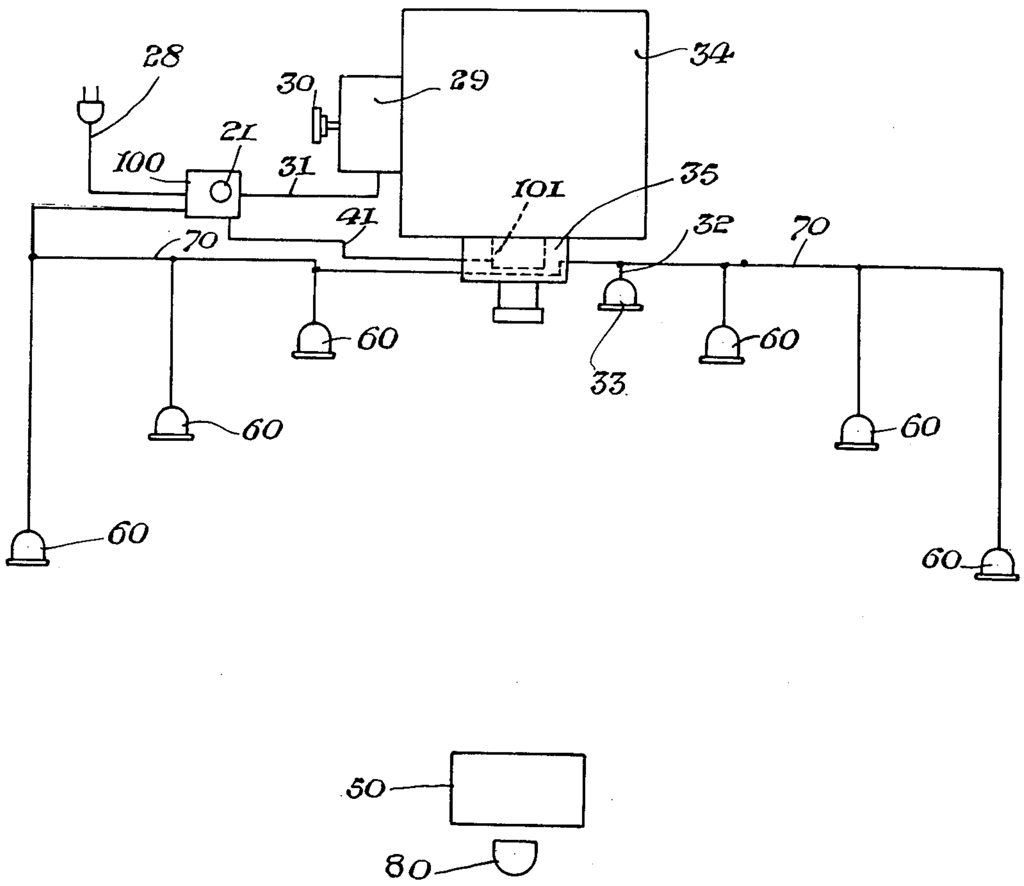

In the drawings,

Figure 1 is a front elevational view with some parts diagrammatically illustrated and some parts broken away for the sake of clarity, illustrating a portion of the equipment constituting this invention; and Figure 2 is a diagrammatic illustration of the complete television lighting system of this invention employing the mechanism of Figure 1 as a part thereof and diagrammatically illustrating the relationship of the system to a scene to be televised.

In accordance with present day practice the televising of a scene or course of action, particularly in a television studio, involves the frequent if not almost continuous relative movement between the pick-up camera and the elements of the action, that is the actors, scenery and the like. As is well understood in this art, the scene being televised is artifically illuminated by an array of light sources, all of which may be fixed with respect to the scene, or some of which may be so fixed with respect to the scene, and others of which may be movable with respect thereto, usually by direct mounting on the mobile television pick-up camera. Good television picture transmission requires substantially constant illumination of the scene during pick-up so that it follows that relative movement between the elements of the scene and the camera, consisting of movements of the camera only, movements of the actors or scenery only, or conjoint movements thereof, cause changes in the effective overall illumination of the scene. This comes about by the fact that in the case where all of the light sources are fixed with respect to the scene, movement of the actors or scenery will change the amount of light reflected to the television pick-up camera. The same result occurs if the elements of the action remain fixed and the pick-up camera is moved with respect thereto, which is particularly true if some of the light sources are mounted on the pick-up camera, as is frequently the case, and moved with it. All of these various movements cause changes in the intensity of illumination of the televised area or the actors therein from a preadjusted correct intensity, and the purpose of this invention is to provide a system which automatically adjusts the effective illumination of the scene and of the individual actors therein to produce a substantially constant light reaction on the pick-up camera.

More specifically, in such a system if the camera is moved closer to a particular actor who may be the center of the action at the moment, or if the actor moves closer to the camera, the amount of light which he reflects to the camera increases whether or not all of the light sources of the lighting array are fixed or only a part is fixed and the remainder moves with the camera. As this is undesirable, the purpose of this invention is to provide an automatically acting light sensitive system wherein the intensity of illumination of the scene will be lowered to produce the same effect on the camera as would have occurred if no movement had taken place. When the relative movement is in the opposite direction, the amount of illumination affecting the camera will decrease. In accordance with this invention the lighting array is automatically controlled to increase the overall illumination to return it to the preset value.

The manner in which these objects are accomplished will be better understood by reference to the pictorial illustrations in the attached drawings.

In Figure 1 there is diagrammatically illustrated in general form a television pick-up camera of the type commonly used, showing it in sufficient detail for adequate illustration of the invention herein disclosed. As shown it includes a dolly, comprising a movable platform 10 having mounted thereon a series of wheel bearings 12 which are connected to the platform so as to be capable of swiveling to various angles on a vertical axis at right angles to the platform 10. Journaled in the bearing members 12 on horizontal axes, are the dolly wheels 11. It is common to provide a dolly of this kind with two wheels at the front and one at the rear so that the dolly can be moved in all directions in a horizontal plane.

Mounted on the baseplate 10 is the usual standard or column 38 on which is mounted a vertically movable pedestal 37, the vertical height of which can be adjusted in any well known manner, as conditions require. A large handwheel 39 is provided for manipulating the dolly in various directions, and if desired for providing vertical adjustment of the pedestal 37. The camera housing 34 is provided with the usual lens turret 35 and is mounted on the pedestal 37 by means of a hinge connection 36, permitting angular inclination of the housing and locking thereof in various inclined positions with respect to the horizontal. It will be understood that this showing of a television pick-up camera is simplified since in modern installations many additional features and adjuncts are used which, however, are not illustrated herein as they have no particular relation to the novel subject matter disclosed.

As illustrated, a suitable light source 33, comprising one element of a lighting array for a television scene, is mounted in camera housing 34 by means of a bracket or other suitable support so that the axis of projection of the light will swing in a horizontal plane with swinging movements of the lens turret, and will move in a vertical plane with vertical adjustments of the pedestal.

It is of course understood that the light source 33 may be attached to the supporting bracket by means of a swivel connection so that it can have relative preadjustments with respect to the pick-up axis of the camera. The illustration of this lighting source is purely diagrammatic since it is known in various forms in this industry. This light source may consist of an incandescent lamp of suitable characteristics mounted in the housing behind a suitable lens, all as well understood in this art. These various details are not essential to this invention and are capable of wide variation in connection with known practices, and hence diagrammatic illustration is adequate.

As further shown in Figure 1, a flexible power cable 28, provided with a suitable plug connector for interconnection with a suitable available current source is provided. A suitable housing 100, mounted on the platform 10 is provided in which the associated vacuum tube amplifier circuit for the light sensitive device is mounted and to which power is supplied by the cable 28. A photoelectric cell 101 is mounted on the pick-up camera housing 34, preferably on the vertical central axis of the lens turret, so as to be in a position to receive substantially the same intensity of reflected light as is transmitted to the active pick-up lens. This photocell is connected to the associated circuit and accessories by means of a cable 40 which extends to the housing 100 and which includes a branch conductor 32, extending to the terminals of the socket of the light source 33.

Mounted on the camera housing is a variable resistor or impedance, enclosed within a housing 29, provided with a control knob 30 by means of which manual adjustments of the associated circuit for the photo-cell can be controlled to adjust the lighting intensity of the connected light sources. The handle 21 on the housing 100 is a diagrammatic illustration of additional manual controls, such as might be associated with a vacuum tube amplifier circuit controlled by a photo-cell, or other light sensitive device, for initial adjustment purposes. The control element 29 is connected to the circuits in the housing 100 by means of the conductor or cable 31.

Since there are so many types of adjunct circuits for light sensitive devices such as photo-electric cell 100, no attempt is here made to diagrammatically illustrate any particular circuit suitable for the purpose. It is intended that there be included within the housing 100, any one of a large number of well known electro-magnetic or equivalent operators energized from the output of the vacuum tube amplifier circuit for the photo-cell for automatically operating a voltage regulator, which is in the circuit of the light source 33. As is apparent, the manual regulator 29 is also in that circuit, so that the original and initial adjustment of the intensity of the light source for starting conditions can be effected.

Figure 2 diagrammatically illustrates the full scope of the invention in that the lighting array includes not only fixed light sources, but the mobile light source 33. The fixed light sources are illustrated at 60 arranged about the front of the scene, in accordance with skilled lighting techniques to properly illuminate it under the control of the manual adjustments 21 and 30 for starting conditions. The circuit for the light sources is shown schematically by the single lines 70 into which the circuit for the mobile light 33 is connected by the conductor 32 previously mentioned. The circuit 70 is connected to the voltage regulating device in the housing 100, as shown. For purposes of explanation, it will be assumed that the rectangle 50 represents a desk or table at the center of the scene, and 80 a chair.

Before describing the versatility of operation of this system it is first to be noted, as is well understood in the art, that the light intensity per unit of area varies in density with the square of the distance of the area. This factor must be taken into account in designing the voltage regulator system for the lighting array, so that it will have a similar voltage response curve. As those skilled in the art will appreciate, this can be accomplished by the design of the voltage regulator or by the design of the drive mechanism therefor, so that with distance changes between the light source and the illuminated object, the voltage will be properly adjusted to increased or decreased intensity of the light sources to maintain substantially constant illumination for these various positions.

All the possible assumptions of operation will be made in describing how the system works, in order to provide full appreciation of its ability to attain the object of this invention under all normal operating conditions. It will be assumed first, for example, that the light sources 60 are all fixed with respect to the scene to be televised, and that the pick-up camera 34, with the light source 33 mounted thereon remains stationary. Assuming further that an actor is seated at the table 80 at the beginning of the scene, and that the knobs 30 and/or 21 have been adjusted to energize the light sources 60 and 33 to the proper intensity to give the desired lighting of the actor at the desk, as the action proceeds if the actor gets out of the chair and moves towards any of the light sources of the array, it is apparent that the intensity of illumination of the actor will increase. Naturally the light reflected by the actor into the camera lens will increase as will the amount of light reflected to the light sensitive photo device 101. The current from the photo-cell will pass through the circuit 41 to the vacuum tube amplifier circuit and the output thereof will be varied in a direction to cause the voltage regulator to increase the impedance of the lighting circuit and thereby cut down the intensity of the light sources the required amount to maintain the illumination of the actor substantially constant, that is of a value for which it was preset at the beginning. Obviously the converse result will occur should the actor move back from his original position away from the light sources.

If the actor at any place in the scene should change his position, so as to reflect more light, as for example if he opened his coat, having on a white shirt there would be an increase in the reflected light to the camera and photo-cell, with the result that the intensity of illumination of the light sources would be reduced the proper amount.

It is obvious that if the actor remained stationary and the camera 34 was moved with respect to him, either towards or away from him, directly or at an angle, any resulting changes in illumination of the actor by reason of the movement of the light source 33 with the camera, will similarly affect the photo-electric cell and the voltage regulating device, changing the intensity of illumination of all of the sources in the right direction and in the correct amount. It is apparent that the pick-up camera 34 is mobile in all directions in a horizontal plane, in view of the swiveled wheel support therefor, so that with these changes and the movement of the light source 33 there will be changes in illumination of the scene and the actors which will be corrected as previously expalined.

It naturally follows that if both the camera and the actor move about the system disclosed will be sensitive to light changes and these changes will be corrected in the proper sense to maintain substantially original preset illuminating values.

It is of course understood that the circuit wires to the light sources will be in the form of a cable of suitable length so as not to interfere with the camera movements.

From the above description it will be apparent that the objects of this invention are attained with lighting in which all of the light sources are fixed, as well as in cases where all of the light sources move, or some are fixed and some move. Since the results are the same whether the actors move or the camera and/or the lighting systems move, it is apparent that as disclosed the system has universal application to attain the objects herein set forth.

As those skilled in the art will appreciate, the subject matter of this invention is capable of considerable variation in its detail, and I do not, therefore, desire to be strictly limited to the illustrative example herein given, but only as required by the appended claim.

What is claimed is:

In a lighting system of the type described, the combination including a camera, a lighting array to illuminate an action scene being viewed by said camera, means including a voltage regulating device for adjusting the energization of said lighting array, and means including a photo-electric controlled actuator for said voltage regulator, said photo-electric device being mounted on the camera and having a photo-sensitive surface facing said scene, whereby variations in intensity of illumination of the scene incident to the relative movements of the elements of said scene with respect to said camera as the action progresses causing energization of said lighting array to maintain substantially at a preset value the intensity of the light reflected by said scene to said camera.

References Cited in the file of this patent

UNITED STATES PATENTS

| | | |
|---|---|---|
| 947,490 | Gwozdz | Jan. 25, 1910 |
| 1,216,696 | John | Feb. 20, 1917 |
| 2,200,736 | Bedford | May 14, 1940 |
| 2,596,376 | De Goeij | May 13, 1952 |

FOREIGN PATENTS

| | | |
|---|---|---|
| 610,146 | Germany | Mar. 4, 1935 |